3,151,027
ABRASIVE FOR DENTIFRICE COMPOSITION
William E. Cooley, Wyoming, Robert J. Grabenstetter, Colerain Township, Hamilton County, and Robert W. Broge, Wyoming, Ohio, assignors to The Procter & Gamble Company, Cincinnati, Ohio, a corporation of Ohio
No Drawing. Filed June 7, 1961, Ser. No. 115,327
11 Claims. (Cl. 167—93)

This invention relates to a dentifrice containing, as a cleaning agent, hard mineral particles coated with a synthetic resin. Preferably, the dentifrice contains ionic agents to reduce tooth decay; specifically the latter are fluoride or stannous and fluoride ions.

A satisfactory dentifrice should have a cosmetic effect on the teeth, keeping them light colored. It should also have a functional effect on the teeth and mouth, keeping them clean and free from food debris, thereby aiding prevention of tooth decay. In order to achieve both ends it is necessary to brush with a dentifrice containing a cleaning agent, often called an abrasive. The purpose of the cleaning agent is to aid in removal of the tightly adherent film which, in many persons, contains pigments which color it brown or yellow. The cleaning agent should remove this pellicle film with a minimum of abrasion of the underlying tooth material. Enamel, which covers much of the exposed tooth surface, is relatively hard and is not of as much concern as the softer dentin which may be exposed by receding gums. The ideal cleaning agent is one which effects the maximum removal of the pellicle film with the minimum abrasion of dentin.

Beyond the function of a dentifrice in maintaining oral cleanliness, there is merit in including an agent which acts specifically to reduce tooth decay. Work stimulated by the discovery of the beneficial effect of fluoride in drinking water or topically applied to the teeth has led to the development of dentifrices containing stannous fluoride. The effect of stannous fluoride in a properly formulated dentifrice in reducing incidence of caries has been well established. Recent reports of this effect in the scientific literature are listed in a publication by W. A. Jordan and J. K. Peterson in J. Am. Dental Assoc., 58, 42 (1959). Both the stannous ions and the fluoride ions are believed to contribute to the anti-caries effect. Interest has also been evidenced in dentifrices containing other inorganic fluorides than stannous fluoride and in organic fluorides such as ethanolamine hydrofluorides.

A problem recognized in the scientific and patent literature is that of formulating a dentifrice in which the stannous fluoride or other ionic anti-caries agent will remain available for treatment of the teeth in use rather than reacting with the cleaning agent. Major steps towards the solution of this problem have been taken. U.S. Patent 2,876,166, William H. Nebergall, March 3, 1959, teaches the improved compatibility of heat-treated calcium phosphates with fluorides in dentifrices. Means for maintaining stannous ions in a condition available for reaction with the teeth have received attention in British Patent 804,486, March 11, 1959, which teaches the use of a reservoir of stannous ions in the form of a slightly soluble compound.

The preparation of a cleaning agent with high cleaning to abrasion ratio has been taught in U.S. Patent 2,876,168, R. W. Broge and R. J. Grabenstetter, March 3, 1959. This patent shows preparation and use of calcium pyrophosphate with such properties.

While the advances described are substantial, there is still opportunity to improve the compatibility of the cleaning agent with ionic ingredients such as stannous and fluoride ions and at the same time to maintain or to improve the cleaning to abrasion ratio.

An object of this invention is to provide a cleaning agent which is effective in removing pellicle films from the teeth and which causes a minimum of abrasion to dentin.

An additional object of this invention is to provide a preferred dentifrice in which a substantial amount of stannous and fluoride ions do not react with the cleaning agent and thus remain available for treatment of the tooth surfaces on use.

These and other objects are achieved in a dentifrice formulation comprising, as the essential cleaning agent, hard inorganic particles coated with a substantially water-impervious, cross-linked, thermo-setting, highly-polymerized synthetic resin, the coated particles having a specified range of mean diameters. Preferably the dentifrice contains a water-soluble source of fluoride or fluoride and stannous ions.

Hard inorganic mineral substances are not generally suitable per se as dentifrice cleaning agents because they are too abrasive. Such substances are, however, utilized to good advantage in this invention as the force behind effective cleaning of the teeth. The hardness and rigidity of a certain class of particulate mineral substances provide the basis for effective cleaning, while the problems of abrasiveness are overcome by using a softer resinous coating material as hereinafter more fully described.

The inorganic mineral substance should have a hardness on Mohs' scale of not less than 2. Hardness can range up to 10, which is the maximum hardness on Mohs' scale. A hardness less than 2 does not provide particles of sufficient rigidity and force to result, after coating, in an effective cleaning agent. Preferably, the hardness of the mineral substance is greater than 5 on Mohs' scale. Harder substances result in more effective cleaning and more complete coating with the synthetic resin can be achieved. (A more complete coating is highly desirable as hereinafter described.)

The hard particulate mineral substance should have a mean particle diameter substantially in the range of about 1 micron to about 15 microns. Smaller sizes do not result, after coating, in effective cleaning agents. Larger sizes, after coating, tend to feel gritty in the mouth and to stick between the teeth. A small amount of particles finer than about 1 micron can be tolerated, preferably not more than 10% of the total amount of mineral substance. The preferred size range of the hard mineral particles is 2 microns to 10 microns.

Examples of hard mineral (or mineral-like) substances useful in the cleaning agent of this invention are silica (sand, quartz), ground glass (calcium silicate), silicon carbide (grit), pumice, alumina, ilmenite ($FeTiO_3$), $CeO_2$, $Fe_2O_3$ (hematite), $ZrO_2$, zirconium silicate, $SnO_2$, topaz (aluminum hydroxy fluoro silicate), and $TiO_2$. Any of the many other mineral substances, such as hard silicate minerals, found in nature or manufactured, which have the above hardness and particle size requirements, can be used. Silica is very much the preferred hard mineral substance in this invention.

Examples of other mineral substances which are suitable, but which are not quite as hard as the materials listed above, are $CaHPO_4$, $CaHPO_4 2H_2O$, $Ca_2P_2O_7$, $CaSO_3$, $Ca_3(PO_4)_2$, insoluble sodium metaphosphate, fluorite, gypsum, and apatite. Some of these materials are themselves often used as cleaning agents in dentifrices. By coating them with certain synthetic resins in accordance with this invention, their cleaning and abrasion characteristics, and especially their ionic compatibility characteristics, can be substantially improved.

In the present invention, the hard particulate mineral substance is coated with a certain class of synthetic resins.

Hans Schmidt in U.S. Patent 2,130,034 has taught the use of synthetic resins in dentifrices. He discloses a variety of thermo-plastic and thermo-setting resins, but does not disclose or suggest the type of highly polymerized resin employed as a coating for the hard particulate core material used in the cleaning agent of the dentifrice formulations proposed herein. The combination of a hard mineral core and a resinous coating material provided herein results in an agent which often cleans better and with lower abrasion than either substance alone in comparable particulate form.

The resins suitable for use in the present invention are substantially water-impervious, cross-linked, thermo-setting highly polymerized resins. A thermo-setting resin is one which solidifies on heating and cannot be remelted. This property arises from the formation of cross-links between polymer chains during a chemical reaction, which is promoted by heat or chemical means. The resulting three-dimensional network of polymers is the type of structure which is suitable for the purposes of this invention. Some thermo-setting plastics soften at temperatures of about 120° C., and these are included in the term "thermo-setting" as it is used herein.

By "substantially water-impervious" is meant resins which do not take up appreciable water on prolonged contact. Preferably water absorption in 24 hours at 25° C., according to ASTM Test D-570-57T, is less than about 1%. The absorption of water leads to swelling and softening of the resin particles which is undesirable in a dentifrice cleaning agent. Casein resins are examples of a type of thermo-setting plastic which is unsatisfactory because of relatively high water absorption.

Common types of thermo-setting synthetic resins which are useful as the coating material for this invention, when highly polymerized, are melamines, phenolics, ureas, melamine-ureas, cross-linked epoxies, and cross-linked polyesters, especially cross-linked diallyl phthalate polyesters.

The thermo-plastic resins which are not generally suitable for use in this invention can be melted and resolidified without losing their original properties. Their properties, presumably lower hardness and rigidity than the thermo-setting resins, are not such that they effectively remove pellicle film from teeth. Examples of common thermo-plastic resins are acrylics; cellulosics, such as acetates and butyrates; polyamides; polyethylenes; polystyrenes; and vinyls. Some types of thermoplastics, however, such as polystyrene, can be modified so as to have an appreciable degree of cross-linking, and hence of thermosetting character. Such modified thermoplastics can function satisfactorily as the coating material of this invention.

The resinous coating in a highly polymerized condition is generally softer than the hard core material, thus using the rigidity and hardness of the core for the force behind the cleaning and at the same time avoiding the abrasiveness of the core material, and in the preferred aspects of this invention, avoiding the relative ionic incompatibility of the core material. To achieve these advantages, however, it is essential that the synthetic resin coating be in the highly polymerized state obtained by heat curing. Heat curing provides the thermosetting synthetic resin coating with the desired hardness for effective cleaning, but with low abrasion. Heat curing also provides the resin with the desired degree of ionic compatibility. Without the proper amount of heat curing these properties are not obtained.

The highly polymerized synthetic resins for use in this invention are as free as possible from low molecular weight materials and extenders. They should be highly polymerized to achieve a minimum content of the low molecular weight starting material and maximum cross-linking. Low molecular weight impurities such as monomers and other starting materials are to be avoided since they do not provide good cleaning characteristics and they can react with stannous and fluoride ions and can lead to off odors and flavors. Extenders (e.g., wood flour, cellulose, asbestos and mica) are commonly used in the plastics industry to increase inexpensively the bulk of a synthetic resin and should be avoided in the present invention because of their strong tendency to sorb ionic ingredients, e.g., stannous and/or fluoride ions.

Heat curing of thermosetting synthetic resins, as noted above, involves the formation of cross-links and a three-dimensional network of polymers. The degree of necessary heat curing varies from resin to resin and in itself is extremely difficult to measure. For the purposes of this invention the desired degree of heat curing is readily determined by setting a standard of hardness to be achieved, and in the preferred embodiment, also setting a standard of ionic compatibility.

Thus, the synthetic resin coatings of the cleaning agent of this invention must be heat cured (to achieve a high degree of polymerization and cross-linking) to a hardness equivalent to a dentin abrasion ratio of not less than about 0.2, preferably not less than 0.5, according to the test hereinafter described. Heat curing does not result in a resin coating which is too hard. Thus, there is no upper limit on the degree of heat curing; however, decomposition, i.e., over-curing or depolymerization, must be avoided. In the preferred embodiment, the resin must be heat cured to an ionic compatibility equivalent to not less than about 30% according to the stannous ion test described hereinafter. The preferred hardness characteristics of the resin are equivalent to a dentin abrasion ratio in the range of 0.7 to 2.0.

The coated particles making up the cleaning agent of this invention consists of about 30% to about 90% by volume of the hard particulate mineral substance and about 70% to about 10% by volume of the resinous coating material. The quantity of particulate mineral substance varies inversely with the amount of the resinous coating material. An amount of particulate mineral substance less than about 30% does not provide the cleaning advantages obtainable from a hard, rigid cleaning force. An amount of particulate mineral substance greater than about 90% results in a completeness of coating less than the minimum tolerable amount.

Completeness of coating should average not less than about 50%, preferably not less than 75% in order to avoid abrasiveness and ionic incompatibility problems which arise from exposed mineral core material. Completeness of coating can be determined by microscopic examination and visual estimation; it can also be done by obtaining the ionic compatibility, respectively and separately, of the finished, resin-coated product, the uncoated particulate mineral and the mineral-free resin which has been given the same treatment as the coating, and then interpolating on the basis of the relative compatibilities. (Ionic compatibility is indicative of coating completeness.)

The coated particles should have a mean particle diameter in the range of about 2 microns to about 20 microns based on the same considerations listed above for the particle size of the hard mineral core material. Preferably not more than 10% of the coated particles have a mean diameter of less than about 2 microns. Finer particles are relatively ineffective in cleaning teeth, and therefore the fraction of fines is limited. The preferred size of coated particles is in the range of 5 microns to 10 microns. By particle is meant agglomerates as well as individual particles. It might be supposed that only particles with sharp edges and corners would be effective in removing pellicle film from the teeth. However, it has been discovered that roughly spheroidal particles and agglomerates of roughly spheroidal particles also serve as effective cleaning agents. The particle diameters referred to herein were determined by microscopic measurements using a calibrated eyepiece.

The coated particles comprising the cleaning agent of the dentifrice of this invention should have a cleaning grade of not less than about 4, preferably not less than 6.5, according to the cleaning test hereinafter described.

Thus, in more specific terms the dentifrice composition of this invention is described as one in which the essential cleaning agent is an inorganic mineral substance, having a hardness on Mohs' scale greater than 2, in the form of particles having a mean diameter in the range of about 1 micron to about 15 microns and being coated with a substantially water-impervious, cross-linked, thermosetting, highly polymerized synthetic resin; the resin has been heat cured to a hardness equivalent to a dentin abrasion ratio of not less than 0.2 according to the test hereinafter described; the cleaning agent consists of about 30% to about 90% by volume of the hard inorganic mineral substance and about 70% to about 10% by volume of the thermosetting synthetic resin; the average coating completeness of the coated mineral particles is not less than about 50%; the coated particles have a mean diameter in the range of about 2 microns to about 20 microns and have a cleaning grade of not less than about 4 according to the test hereinafter described.

The synthetic resins suitable for use in the coated particulate cleaning agent of this invention are described below.

Melamine resins, the product of polymerization of melamine and formaldehyde, are suitable for use as the coating material for the cleaning agents of this invention because of their excellent physical properties and compatibility with ionic ingredients combined with freedom from color and odor. Melamine resins ordinarily contain about 2 to about 4 moles of combined formaldehyde for each mole of melamine. These resins can be defined more specifically as a mixture of methylol melamines from mono- to hexamethylol melamine. The polymers are products of condensation reactions between pairs of methylol groups, or between methylol groups and amino groups. The bonding of the methylol groups and low polymers during polymerization, such as polymerization effected by heat curing, provides the final three-dimensional high polymer characteristics of the coating of the particulate cleaning agent of this invention.

Phenolics and ureas, i.e., phenol-formaldehyde and urea-formaldehyde resins, are desirable from the standpoint of physical properties and compatibility, and their chemical and polymeric structure is comparable to that described above for the melamine-formaldehyde resins. These resins are often difficult to obtain in a color-free highly polymerized condition and are, therefore, less desirable for the formulation of a white dentifrice.

Polyesters, or alkyd resins, are the product of esterification reactions between polyhydric alcohols and polybasic acids. In order to prepare a thermo-setting cross-linked polyester, a dihydric alcohol and a dibasic acid, either or both of which contains a double bond, are esterified and the resulting unsaturated polyester is then cross-linked by reaction with a monomer such as styrene. Commonly, a saturated dihydric alcohol, such as ethylene glycol, propylene glycol, 1,3- and 2,3-butylene glycol, diethylene glycol and dipropylene glycol, is reacted with an unsaturated dibasic acid, such as maleic anhydride or fumaric acid. The polymerizable monomer can be styrene, vinyl toluene, diallyl phthalate, methyl methacrylate or triallyl cyanurate, for example. The diallyl phthalate resins are linear chains, the monomeric units being linked through a carbon to carbon type polymerization. Heat or a peroxide catalyst, alone or in combination, are used to bring about the polymerization.

Epoxy resins are made by reacting epichlorohydrin with polyhydric compounds such as bisphenols and glycols. The resulting polymers are cross-linked to form thermosetting resins by direct reaction between epoxy groups, linkage of epoxy groups with aromatic or aliphatic hydroxyls, and cross-linking with curing agents through various radicals. The most common cross-linking agents are polyfunctional primary and secondary amines and dibasic acids or acid anhydrides.

The preferred resins are melamine-formaldehyde resins, urea-formaldehyde resins, diallyl phthalate resins, and urea-melamine formaldehyde resins.

The low molecular weight starting materials of the resins described above are polymerized in commercial practice by reactions promoted by heat, with or without a catalyst present. Pressure is sometimes used with heat in commercial practice during polymerization, such as in molding operations. The highest degree of resin polymerization found in commercial molding practice is that obtained when a resin is used in a molding process which involves high temperatures and pressures for several minutes of time.

It has been found that the resins used as the coating material for the cleaning agents in the compositions of this invention should be polymerized (after coating) substantially beyond the resin polymerization of current commercial practice. Commercially cured resins do not have the cleaning ability and ionic compatibility which is desired for fluoride-containing dentifrices. Present commercial cures do not effect the high degrees of cross-linking and reduction of residual low molecular weight starting materials which are essential to obtain these properties.

The resinous cleaning agents used herein as the coating material should undergo a heat polymerization for a period of time measured in minutes or hours at temperatures in the range of about 100° C. to about 180° C. to obtain the desired properties. Optimum temperatures vary with the resin but should be sufficient to effect polymerization without charring the resin. For example, polymerization conditions at atmospheric pressure can range from 30–60 minutes at 100–120° C. for polyesters to 4–16 hours at 150–165° C. for melamine resins. Polymerization, cleaning effectiveness, and ionic compatability of the resins increase with increased times and temperatures of treatment. Greater increases in the degree of polymerization are obtained with increased temperatures of treatment than with increases in time of treatment. However, the times of treatment always should be substantially greater than the polymerization times found in present-day commercial molding practice.

Some degree of polymerization can be effected with an acid and is especially useful for melamine-formaldehyde resins, urea-formaldehyde resins, and melamine-urea-formaldehyde resins, but further heat polymerization is necessary. Acid polymerization is effected by adding an acid, usually a strong acid such as $HNO_3$, to the low molecular weight starting material in water. Polymerization is allowed to advance at a temperature below the boiling point of the solution.

The coated particulate cleaning agent of this invention is made by preparing the mineral substance of the specified hardness characteristics in particulate form in the particle size range described above. These particles are then coated with the synthetic resin. Prior to coating, the resin should be in a form which can be used in a coating operation, i.e., a form which can be dissolved, melted or fused prior to or during the coating. The usual commercial form of resins, e.g., a liquid form or a water- (or other solvent) soluble powdered form having a relatively low degree of polymerization and cross-linking, can be used. These commercial forms of resins are used to coat the hard particulate mineral substance. Then, during the coating step, and/or subsequently, the resin is subjected to the essential high degree of polymerization and cross-linking described above.

One method of performing the coating operation is to prepare the particulate mineral and suspend it, in appropriate proportions, in a liquid resin preparation (molten or a solution). The suspension of the particulate mineral in the liquid resin should be uniform. Even when the amount of resin is small, relative to the particulate mineral, it should, and usually does, act as a matrix for the mineral particles. Then polymerization is effected, as by heating for a period of time. The desired degree of polymerization can be effected at this time, or a partial polymerization can be effected with the remaining polymerization accomplished in subsequent steps. In any event, sufficient polymerization is effected to permit the resulting block of polymerized resin containing suspended particulate mineral substance to be ground up to the desired particle size. After grinding, further polymerization can be effected as necessary. Further grinding after any such further polymerization can also be effected as necessary to achieve the desired size range. Conventional grinding methods can be employed, such as impact, tube, hammer and ball mills.

Grinding to the desired particle size results in a cleaning agent comprising resin-coated, hard mineral particles, either in individual or agglomerate form. So long as the mineral particles are of the hardness specified above and the proportions of resin and mineral substance specified above are used, the percentage of exposed mineral substance will be kept to the minimum tolerable amount, i.e., less than about 50%, preferably less than 25%. Higher percentages of average coating completeness can be achieved with harder mineral substances and/or greater proportions of resin coating.

Other methods can be used to achieve coating of the hard particulate mineral substance. Liquid resin (melted or in solution) can be sprayed on to the mineral particles in a rotating drum or a fluidized bed, for example. Powdered resin can be uniformly mixed with the particulate mineral substance and then the mixture can be fused together to form a block which can be subsequently ground up and further treated as described above. A desirable method of coating hard mineral particles with a preferred melamine type resin to form spheroidal particles is described in copending application Serial No. 65,679, filed October 28, 1960.

An indication of the types of thermo-setting resins which are suitable for use in this invention has been given. So long as the resin meets the other requirements set forth, i.e., being water-impervious, being cross-linked and being thermo-setting, the exact chemical nature of the resin, so long as it is highly polymerized to the described extent, is not critical to its performance as an effective cleaning agent in the dentifrices of this invention. Commercially available materials in various stages of polymerization can be made suitable by effecting substantial further polymerization as described above. Specific resins suitable for use in this invention and their processing are shown in examples given hereinafter.

Fluoride ions are a constituent of the preferred dentifrice compositions of this invention. They may be supplied by any water-soluble innocuous compound of fluoride which provides fluoride ions on contact with water. By innocuous compound is meant a compound which is not undesirably toxic, highly colored, or otherwise objectionable for use in a dentifrice. Many water-soluble inorganic salts are suitable sources of fluoride ion. Examples of suitable water-soluble fluoride compounds are sodium and potassium fluoride, which are economical and have desirable properties, ammonium fluoride, indium fluoride, i.e., $InF_3$, palladium fluoride, i.e., $PdF_2$, ferrous fluoride, lithium fluoride, and mixtures thereof. Complex water-soluble fluoride-containing salts such as fluorosilicates, e.g., $Na_2SiF_6$, fluorozirconates, e.g., $Na_2ZrF_6$, $K_2ZrF_6$, fluorostannites, e.g., $KSnF_3$, fluoroborates, e.g., $NaBF_4$, and fluorotitanates are also suitable for use in the dentifrices of this invention. Mixtures of fluoride salts can be used.

Preferred inorganic water-soluble fluoride salts are those which also contain stannous ions for they provide the beneficial effects of both fluoride and stannous ions. Examples of suitable stannous fluorides are stannous fluoride itself, mixed stannous halides such as SnClF and $Sn_2ClF_3$, and fluorostannites. It is also suitable to supply stannous ions from a compound other than a fluoride, e.g., stannous chloride or stannous nitrate.

It is not necessary that the fluoride ions be supplied by an inorganic salt. They may be supplied by an organic fluoride which is soluble in water or at least which dissociates to give fluoride ions in contact with water. The fluoride ions may also be supplied by organic hydrofluorides. Suitable amine fluorides disclosed in Canadian Patent 543,066 are the mono-, di- and triethanolamine hydrofluorides. These compounds may also be named as the corresponding ethanol-ammonium fluorides. Other useful organic fluorides and hydrofluorides are disclosed in Canadian Patent 594,553 and Belgian Patent 569,397.

The essential ingredients of the dentifrices of this invention may be compounded in a number of cosmetically acceptable forms. For example, they may be compounded as a powder or as a paste. In formulating the finished dentifrice it is desirable to use auxiliary agents which do not precipitate, complex, or otherwise react with stannous or fluoride ions, thereby decreasing the advantage provided by the compatible resinous cleaning agent. Some loss of stannous ions is probably inevitable because of oxidation and slow hydrolysis.

Toothpastes usually contain a humectant, a sudser, a binder, a sweetener, and a flavor in addition to a cleaning agent. Fluoride ion itself is compatible with the auxiliary ingredients of the toothpaste which are conventionally used in dentifrices. If stannous ion is also present, these ingredients preferably should be selected with greater care. Glycerine and sorbitol are humectants compatible with stannous ion. Binders of a non-ionic character are preferred, for they are generally compatible with stannous ions; example are hydroxyethyl cellulose and very high molecular weight polyethylene oxides. Nonionic and cationic detergents are compatible sudsers. Suitable non-ionics include sucrose monolaurate and the condensation product of dodecyl alcohol with 1–6 moles of ethylene oxide. Many of the commonly employed flavoring oils are compatible with stannous ions. Ionic toothpaste ingredients, such as anionic sudsing agents and carboxy methyl cellulose binders, can be considered for use with stannous ions if used in small amounts.

If stannous ions are to be present in the dentifrice, as will be the case in the preferred embodiment of this invention, they are used at a level of from about 1000 p.p.m. to about 9000 p.p.m. The preferred level is from about 2000 p.p.m. to about 4000 p.p.m. since there is no need to provide an amount for reaction with the cleaning agent. Fluoride ions are present at a level of greater than about 25 p.p.m. in order to achieve the desired effect. There is little advantage in having more than about 4000 p.p.m. fluoride ions present, and preferably the fluoride level will be from about 500 p.p.m. to about 2500 p.p.m. In a toothpaste the cleaning agent described herein will constitute from about 10% to about 50% of the composition. Preferably it will be from about 20% to about 40% of the composition. In a tooth powder, higher proportions of cleaning agent, up to about 95%, are used. Typical usages of humectant, sweetener, binder, sudser, and flavor are illustrated in the specific examples.

It is desirable to adjust the pH of the paste to the optimum range indicated hereinafter. The acids chosen for pH adjustment are strong acids or, desirably, are weak acids. They are preferably not strong stannous ion sequestrants if tin is to be present in the composition. Examples of such weak acids are acetic, chloropropionic, malonic, formic, fumaric, methoxy-acetic, and propionic.

The pH of toothpastes of this invention is higher than about 3 and lower than about 7. Lower pH's than 3 are not desirable for use in the mouth and lead to problems of hydrolysis of some of the ingredients of the paste and problems of corrosion of metal containers. When stannous ions are present, the pH preferably should be lower than about 5. In the absence of stronger complexing agents than fluoride, the stannous ion precipitates as hydrous stannous oxide at higher pH's. If resins, such as melamines, which have a natural alkalinity, are used as the cleaning agent, neutralization of the resins should be effected before they are associated with stannous ions. A balance of desirable consumer properties and effectiveness is attained in the preferred pH range of from about pH 3.5 to about pH 5.0. When stannous ions are not present, the preferred pH range is somewhat higher, being from about pH 4.5 to about pH 7. It is necessary to insure that the toothpaste does not attack the teeth. Lower pH values are safer in the presence of stannous ions than in their absence. Lower pH's are generally preferred if other heavy metal ions such as indium ions are present.

DENTIN ABRASION TEST

The dentin portions are separated from human cuspids having not more than minor imperfections. These tooth portions are amounted in Wood's metal, carefully weighed at constant humidity to preserve the natural moisture within the tooth, and submerged in a slurry of the abrasive material to be tested. The slurry is made at a concentration of 25 g. of the abrasive material per 50 cc. of 1% aqueous carboxymethylcellulose solution. A conventional toothbrush is arranged so that it can be moved back and forth across the surface of the submerged dentin portion to abrade it. The pressure of this toothbrush is adjusted to 150 grams. The tooth dentin is subjected to the brushing action for 10,000 double strokes. The tooth dentin is then removed from the slurry, washed and surface-dried. The dentin is then weighed at constant humidity to determine the loss of weight of the dentin measured in micrograms.

For a given cleaning agent, the loss of dentin, by weight, according to this test, is compared with the loss of dentin for a standard cleaning agent on the same tooth. This comparison is given as a ratio of the loss of dentin for the cleaning agent being tested to the loss of dentin for the standard cleaning agent. This ratio then is the dentin abrasion value. A ratio, based on a comparison with a standard on the same tooth, is used instead of an absolute value of dentin loss because the human tooth samples vary in susceptibility to abrasion.

The standard used in this test is the high cleaning-to-abrasion ratio calcium pyrophosphate ($Ca_2P_2O_7$) cleaning agent described in U.S. Patent 2,876,168.

CLEANING GRADE TEST

The cleaning grades for the coated particulate cleaning agents of this invention are determined by the following test:

White polyester plastic blocks having a surface measuring 10 mm. x 12 mm. were ground smooth. The blocks were washed and dried. One drop of ethyl acetate was placed on the level, dry, dust-free surface and allowed to spread. Then three drops of a mixture consisting of 2 parts ethyl acetate and one part of black lacquer (FoMoCo-Color Patch, Black M—1724, made by the Ford Motor Company, or Sheffield High Gloss, made by the Sheffield Bronze Paint Corp.) were applied. In one minute the lacquer dried to a tacky surface and drying was completed in three ten-minute stages. The blocks were covered with metal cans for the first stage; the cans were tilted to allow partial access of room air currents during the second stage, and the cans were removed for the third stage. Such a drying process gave uniform and reproducible films. The blocks were heated for ten minutes, 10 inches below a heat lamp, and then cooled. The blocks were prepared in sets of 50 to 100. The blocks were inserted in slurries of cleaning agents to be tested and brushed by toothbrushes moving back and forth across the face of the block. The slurries of test materials were of equal viscosity (70 cps. at room temperature). Equal viscosities were used rather than equal weights of test materials in order to approximate more closely the conditions which would be encountered when using the cleaning material being tested in a toothpaste. The blocks were brushed 3000 double strokes. Reflectance measurements were then taken with a Photovolt Reflectometer on the brushed surface.

The sets of blocks were standardized by measuring the cleaning power of standard $Ca_2P_2O_7$ and $CaHPO_4 \cdot 2H_2O$. The reflectance measurement obtained on a block brushed with $Ca_2P_2O_7$ was assigned a cleaning grade of 8, and that for $CaHPO_4 \cdot 2H_2O$ was set at 5. On a plot of reflectance measurements vs. cleaning grade a curve fitted to these points as references and also passing through the origin was used for converting reflectance measurements to cleaning grades for all the blocks in the set. The cleaning grades run from 0 to 10 on the scale thus established.

IONIC COMPATIBILITY TEST

The ionic compatibility for the coated particulate cleaning agents of this invention is determined by the following test:

A solution is prepared which consists of 250 parts of glycerine, 250 parts of water and 4 parts of stannous fluoride. To 25 parts of this solution is added 20 parts of the cleaning agent to be tested for stannous ion compatibility and 5 parts of water. In the blank (or control) sample, 25 parts of water free from cleaning agent is added to 25 parts of the solution. The air in the samples is replaced with nitrogen before capping tightly to prevent oxidation of the stannous ions. The samples are then stored at room temperature. The presence of glycerine retards the natural hydrolysis of the stannous ions and thus permits a better measure of the rate of absorption of the ions by the cleaning agent. At intervals the concentration of the stannous ions is determined iodimetrically. The compatibility is measured in terms of percent stannous ions remaining in the sample (relative to the blank sample). Although determinations are made at intervals up to several months, the standard time for comparison is the percent stannous ions remaining after 3 weeks and, as herein used, the compatibility grade of a particular cleaning agent refers to the percent stannous ions remaining after 3 weeks according to the above described test.

It has been determined arbitrarily that the minimum compatibility grade, when high ionic compatibility is desired, is about 30%, preferably 50%. This grade can be compared with the grades of mineral cleaning agents commonly used in dentifrices as follows: Calcium pyrophosphate about 10%; alumina about 5%; dicalcium orthophosphate about 5%. Thus, the cleaning agents of this invention can be prepared to have a very high ionic compatibility. Desirably the ionic compatibility is not less than 70%.

The compatibility test above described is more rigorous than conditions ordinarily found in dentifrices. Stannous ions are used as a basis for determining ionic compatibility because they appear to be more sensitive, than any other ionic ingredient known for use in dentifrices, to reactivity with, or sorption by, cleaning agents. Compatibility of fluoride ions with the cleaning agents of this invention is also an important problem; but the fluoride ions do not appear to be as sensitive to incompatibility with the resin-coated cleaning agent of this invention as stannous ions. If a given resin-coated cleaning agent is compatible with stannous ions to a satisfactory degree, it will also be compatible with fluoride ions to a satisfactory extent.

Following are examples which are illustrative of the invention. Parts are by weight.

Example 1

200 parts of acetone were mixed with 130 parts of Dapon and 130 grams of silica. The silica had a mean particle diameter of 4 microns. Silica has a Mohs hardness of 7. Dapon is a trade name of the Food Machinery and Chemical Corporation and is a powdered, solid prepolymer prepared by reacting diallyl phthalate monomer with itself to form a linear chain, the monomeric units being linked through a carbon to carbon type polymerization. The mixture was stirred thoroughly until the diallyl phthalate resin was dissolved. Then 4 parts of benzoyl peroxide was added as a polymerization catalyst for the resin and the whole mixture was poured onto a pan of aluminum foil to cure overnight in the open air. (The acetone evaporated.) The next day the pan of partially cured mixture was placed in an oven at 350° F. to cure for one hour. The cured resinous mixture was milled in a Pulva mill.

The resin-coated particles of silica had a mean particle size of 15 microns with less than 10% having a size smaller than 5 microns. There were no particles or agglomerates larger in size than 20 microns. The coating completeness of the particles was 75%. The coated particles had a dentin abrasion ratio of 2.82 and had a cleaning grade of 9 when made up into the dentifrice slurry used in the Cleaning Grade Test. The coated particles had an ionic compatibility value of 79%. The volume of the silica in the particulate cleaning agent was 32% and the volume of the resin was 68%.

A toothpaste formulation can be made up as follows, percentages being by weight:

| | Percent |
|---|---|
| Silica particles coated with heat cured diallyl phthalate resin as described in Example I | 25 |
| Flavor | 0.9 |
| Hydroxy ethyl cellulose | 1.5 |
| Saccharin | 0.2 |
| Glycerine | 30 |
| Stannous flouride | 0.4 |
| Water | 41 |
| Condensation product of dodecanol with 6 moles of ethylene oxide | 1.0 |

This toothpaste is effective in cleaning teeth with a minimum of abrasion. The stannous fluoride provides anticaries activity which is maintained in the paste because of the excellent compatibility of the cleaning agent. The stannous fluoride can be omitted if a dentrifrice without an anticaries fluoride salt is desired.

*Example II*

80 parts of a water-soluble urea-formaldehyde resin powder, having a molar ratio of urea to formaldehyde estimated to be 1:2.5, were dissolved in 250 parts of water. This solution was added to a solution of 5 parts of concentrated nitric acid in 150 parts of water in which 160 parts of powdered silica, having a mean particle diameter of 4 microns, were suspended. The acid-polymerized resin-coated silica was dried overnight at room temperature and then placed in an oven at 90° C. for further drying. After drying the material was cured at 140° C. for 16 hours; after cooling it was ground in a Pulva mill and a ball mill to a product having a particle size range of 5 to 20 microns.

The coating completeness of the particles was 80%. The volume of the silica in the particulate cleaning agent was 50% and the volume of the resin was 50%. The coated particles had a dentin abrasion ratio of 0.8, a cleaning grade of 7.5 and an ionic compatibility of 50%.

A toothpaste having effective cleaning and low abrasion characteristics was made up as follows, percentages being by weight:

| | Percent |
|---|---|
| Silica particles coated with urea formaldehyde resin as described in Example II | 25 |
| Flavor | 0.9 |
| Hydroxy ethyl cellulose | 1.5 |
| Saccharin | 0.2 |
| Glycerine | 30 |
| Stannous fluoride | 0.4 |
| Water | 41 |
| Color | 1.0 |

The stannous fluoride provided anticaries activity which was maintained because of the compatibility of the cleaning agent. 0.4% sodium fluoride, indium buoride or triethanolamine fluoride can be used instead of the stannous fluoride to provide anticaries activity.

*Example III*

120 parts of alpha alumina particles having a mean particle size of 5 microns were coated with 80 parts urea formaldehyde resin substantially in the same manner as that described in Example II for the powdered silica. Alpha alumina has a Mohs hardness of 9. The coated particles had a cleaning grade of 7 and a dentin abrasion ratio of 0.6. The coated particles were in the size range of 5 to 20 microns. The coating completeness was 50%. The volume of the alumina in the coated particles was 35%; the volume of the resin was 65%.

The following toothpaste having effective cleaning and low abrasion characteristics can be prepared, percentages being by weight:

| | Percent |
|---|---|
| Alumina particles coated with urea formaldehyde resin as described above in Example III | 25 |
| Flavor | 0.9 |
| Sodium carboxymethyl cellulose | 1.5 |
| Saccharin | 0.2 |
| Glycerine | 30.2 |
| Sodium lauryl sulfate | 1.5 |
| Water | Balance |

The following minerals can be sustituted for the alumina in Example II with susbtantially equal results:

Powdered $SnO_2$ (Mohs hardness 6 to 7) having a particle size of 3 microns

Powdered $ZrO_2$ (Mohs hardness 7 to 8) having a particle size of 3 microns

Ground up Pyrex glass (Mohs hardness 6 to 7) having a particle size of 5–10 microns Milled Topaz (Mohs hardness 8) having a particle size of 7 microns Powdered feldspar ($KAlSi_3O_8$) Mohs hardness 6) having a particle size of 5 microns.

*Example IV*

75 parts of a "Bakelite" liquid epoxy resin (resin ERL 3794 made by the Union Carbide Plastics Company having an epoxy assay of 174–186 grams per gram mole of epoxy) was mixed with 28 parts of a liquid epoxy hardener ZZL0803 (an aliphatic polyamine made by the same company) to form a liquid resin. 150 parts of grit (SiC) having a mean particle size of 10 microns was mixed in to form a thick paste. (Grit has a Mohs hardness of 9.5.) This paste was spread on a steel plate in a thin layer and heated in an oven at 75° C. for 2 hours. The resinous material was removed from the plate, broken into pieces and heated again at 135° C. for 2 hours. The pieces were powdered in a Raymond hammer mill. The mean particle size of the resulting powdered cleaning agent was 15 microns.

The grit particles coated with epoxy resin had a cleaning grade of 5, a dentin abrasion ratio of 0.6, and an ionic compatibility of 50%. The volume of the grit in the coated particles was 40%; the volume of the epoxy resin was 60%. The coating completeness was 90%. The coated particles can be used to formulate a toothpaste having the composition and properties set forth in Example III using the epoxy resin coated grit in place of the urea-formaldehyde resin-coated alumina.

*Example V*

1.8 parts of soluble melamine-formaldehyde resin (Resimene 817, a dry white powder, made by Monsanto Chemical Co.) having a molar ratio of formaldehyde to melamine ranging from 2:1 to 3:1 were dissolved in 16.8 parts of water. To this solution was added 1.8 parts of powdered silica having a particle size ranging from 4 to 7 microns. The solution was heated to 75° C. .085 part of concentrated nitric acid in 3.6 parts of water was added to the solution to polymerize the resin which was then dried. The dried mixture was then oven cured at 135° C. for 2 hours. The cured resin was placed in a ball mill having ½ inch porcelain balls and milled for 4 hours.

The resulting melamine resin coated silica particles had sizes ranging from 5 to 20 microns. The particles had anionic compatibility of 38%, a cleaning grade of 9.5, and a dentin abrasion value of 2.2.

The volume of the melamine resin in the coated particles was 67%; the volume of the silica was 33%. The coating completeness was 70%.

Preparation of resin powders of the type exemplified by Resimene 817 is shown in U.S. Patent 2,485,059.

A toothpaste formulation having effective cleaning and low abrasion characteristics can be made up as follows, the percentages being by weight:

| | Percent |
|---|---|
| Silica particles coated with melamine-formaldehyde resin as described in Example V | 25 |
| Flavor | 0.8 |
| Carboxy methyl cellulose | 1.5 |
| Saccharin | 0.2 |
| Glycerine | 30 |
| Sodium lauryl sulfate | 1.0 |
| Water | Balance |

Particles (2–5 microns) of $CaHPO_4 \cdot 2H_2O$, which has a Mohs hardness of 3, can be coated with melamine-formaldehyde resin to provide a cleaning agent (particle size 5–10 microns) having improved cleaning, abrasion and ionic compatibility characteristics when used in a dentifrice.

*Example VI*

100 parts of a fluid polyester resin containing 34% styrene (Selectron 5003 made by Pittsburgh Plate Glass Co.) was mixed with 100 parts of grit (SiC) having a particle size of 1–2 microns and 1 part of a benzoyl peroxide polymerization promoter. This mixture was cured in an oven at 110° C. for 1½ hours. The cured mixture was powdered in a Pulva mill. Extremely small particles were removed electrostatically. The resulting product had a mean particle size of 15 microns.

The polyester resin coated grit particles were 70% by volume resin and 30% by volume grit. The coating completeness was 90%.

The coated particles had a cleaning grade of 7, a dentin abrasion ratio of 0.65, and an ionic compatibility of 55%. The coated particles can be used as the essential cleaning agent in a toothpaste similar to that set forth in Example I.

Silica having a particle size of 2 microns was substituted for the grit above in Example VI with equivalent results in volume relationship and coating completeness. The resulting product had a cleaning grade of 4 and a dentin abrasion ratio of 0.7. It can be used as the essential cleaning agent in a toothpaste similar to that set forth in Example II.

The synthetic resins used in Examples I through VI were substantially water-impervious, having a water absorption substantially less than 1% according to ASTM Test D–570–57T.

Phenol formaldehyde resins which can be used to coat particulate minerals in accordance with this invention are described in U.S. Patents 2,190,672 (alkaline condensed, high formaldehyde water dispersible phenolic resin) and 2,889,374 (70% aqueous solution of trimethylolphenol).

What is claimed is:

1. A dentifrice, effective in removing dental plaque films, comprising, as its essential cleaning agent, an inorganic mineral substance, having a hardness on Mohs' scale greater than 2, in the form of particles having a mean diameter in the range of about 1 micron to about 15 microns and being coated with a substantially water-impervious, cross-linked, thermo-setting, highly polymerized synthetic resin, said resin having been heat cured to a hardness equivalent to a dentin abrasion ratio of not less than about 0.2, said cleaning agent consisting of about 30% to about 90% by volume of said mineral substance and about 70% to about 10% by volume of said synthetic resin, the average coating completeness of said particles of mineral substance being not less than about 50%, the said resin-coated particles having a mean diameter in the range of about 2 microns to about 20 microns and having a cleaning grade of not less than about 4.

2. The dentifrice of claim 1 wherein the inorganic mineral substance is silica and the synthetic resin is selected from the group consisting of melamine formaldehyde, urea formaldehyde, melamine-urea formaldehyde and diallyl phthalate resins.

3. A dentifrice, effective in removing dental plaque films, comprising from about 25 p.p.m. to about 4000 p.p.m. of fluoride ions supplied by a water-soluble anti-caries fluoride salt and, as its essential cleaning agent which is compatible with said salt, an inorganic mineral substance, having a hardness on Mohs' scale greater than 2, in the form of particles having a mean diameter in the range of about 1 micron to about 15 microns and being coated with a substantially water-impervious, cross-linked, thermo-setting, highly polymerized synthetic resin, said resin having been heat cured to a hardness equivalent to a dentin abrasion ratio of not less than about 0.2 and to an ionic compatibility of at least about 30%, said cleaning agent consisting of about 30% to about 90% by volume of said mineral substance and about 70% to about 10% by volume of said synthetic resin, the average coating completeness of said particles of mineral substance being not less than about 50%, the said resin-coated particles having a mean diameter in the range of about 2 microns to about 20 microns and having a cleaning grade of not less than about 4.

4. The dentifrice of claim 3 wherein the inorganic mineral substance is silica and the said synthetic resin is selected from the group consisting of melamine formaldehyde, urea formaldehyde, melamine-urea formaldehyde and diallyl phthalate resins.

5. The dentifrice of claim 4 wherein the said fluoride salt is stannous fluoride.

6. A toothpaste, effective in removing dental plaque films, comprising, as its essential cleaning agent, an inorganic mineral substance, having a hardness on Mohs' scale greater than 5, in the form of particles having a mean diameter in the range of 2 microns to 10 microns and being coated with a substantially water-impervious, cross-linked, thermosetting, highly polymerized synthetic resin, said resin having been heat cured to a hardness equivalent to a dentin abrasion ratio of not less than 0.5, said cleaning agent consisting of about 30% to about 90% by volume of said mineral substance and about 70% to about 10% by volume of said synthetic resin, the average coating completeness of said particles of mineral substance being not less than 75%, the said resin-coated particles having a mean diameter in the range of about 2 microns to about 20 microns and having a cleaning grade of not less than 6.5, said cleaning agent being present in an amount of about 10% to about 50% by weight of the composition.

7. The toothpaste of claim 6 wherein the inorganic mineral substance is silica and the said synthetic resin is selected from the group consisting of melamine formaldehyde, urea formaldehyde, melamine-urea formaldehyde and diallyl phthalate resins.

8. A toothpaste, effective in removing dental plaque films, comprising from about 500 p.p.m. to about 2500 p.p.m. of fluoride ions supplied by a water-soluble anti-caries fluoride salt and, as its essential cleaning agent, an inorganic mineral substance, having a hardness on Mohs' scale greater than 5, in the form of particles having a mean diameter in the range of 2 microns to 10 microns and being coated with a substantially water-impervious, cross-linked, thermo-setting, highly polymerized synthetic resin, said resin having been heat cured to a hardness equivalent to a dentin abrasion ratio of not less than 0.5, and to an ionic compatibility of at least 50%, said cleaning agent consisting of about 30% to about 90% by volume of said mineral substance and about 70% to about 10% by volume of said synthetic resin, the average coating completeness of said particles of mineral substance being not less than 75%, the said resin-coated particles having a mean diameter in the range of about 2 microns to about 20 microns and having a cleaning grade of not less than 6.5, said cleaning agent being present in an amount of about 10% to about 50% by weight of the composition.

9. The toothpaste of claim 8 wherein the inorganic mineral substance is silica and the said synthetic resin is selected from the group consisting of melamine formaldehyde, urea formaldehyde, melamine-urea formaldehyde and diallyl phthalate resins.

10. The toothpaste of claim 9 wherein the said fluoride salt is stannous fluoride.

11. A toothpaste, effective in removing dental plaque films, comprising from about 500 p.p.m. to about 2500 p.p.m. of fluoride ions supplied by stannous fluoride and, as its essential cleaning agent, silica in the form of particles having a mean diameter in the range of 2 microns to 10 microns and being coated with a synthetic resin selected from the group consisting of melamine formaldehyde, urea formaldehyde, urea-melamine formaldehyde and diallyl phthalate resins, said resin having been heat cured to a hardness equivalent to a dentin abrasion ratio of from 0.7 to 2.0, and to an ionic compatibility of at least 50%, said cleaning agent consisting of about 30% to about 90% by volume of said silica particles and about 70% to about 10% by volume of said synthetic resin, the average coating completeness of said silica particles being not less than 75%, the said resin coated silica particles having a mean diameter in the range of 5 microns to 10 microns and having a cleaning grade of not less than 6.5, said cleaning agent being present in an amount of about 20% to about 40% by weight of the composition.

References Cited in the file of this patent

UNITED STATES PATENTS 2,130,034     Schmidt _____ Sept. 13, 1938